(12) United States Patent
Zhu et al.

(10) Patent No.: US 7,986,979 B2
(45) Date of Patent: Jul. 26, 2011

(54) WIRELESS HEADSET HAVING IMPROVED RF IMMUNITY TO RF ELECTROMAGNETIC INTERFERENCE PRODUCED FROM A MOBILE WIRELESS COMMUNICATIONS DEVICE

(75) Inventors: Lizhong Zhu, Waterloo (CA); George Mankaruse, Kitchener (CA); Michael Corrigan, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 220 days.

(21) Appl. No.: 12/388,137

(22) Filed: Feb. 18, 2009

(65) Prior Publication Data

US 2009/0156127 A1 Jun. 18, 2009

Related U.S. Application Data

(63) Continuation of application No. 11/289,904, filed on Nov. 30, 2005, now Pat. No. 7,515,944.

(51) Int. Cl.
*H04M 1/00* (2006.01)
*H04B 1/38* (2006.01)
*H04B 1/00* (2006.01)

(52) U.S. Cl. .................. 455/569.1; 455/570; 455/575.1; 455/296; 455/300; 455/301; 439/76.1; 439/78; 439/83

(58) Field of Classification Search ................. 455/41.1, 455/41.2, 41.3, 569.1, 570, 575.1, 296, 300, 455/301; 439/76.1, 78, 83
See application file for complete search history.

(56) References Cited

U.S. PATENT DOCUMENTS

| 6,453,154 B1 | 9/2002 | Haber et al. ..................... 455/90 |
| 2002/0111140 A1 | 8/2002 | Kim .................................. 455/41 |
| 2002/0151329 A1 | 10/2002 | Prince et al. .................. 455/557 |
| 2003/0044033 A1 | 3/2003 | Julstrom et al. .............. 381/315 |
| 2003/0045235 A1 | 3/2003 | Mooney et al. ................. 455/41 |
| 2003/0123686 A1 | 7/2003 | Berger et al. ................. 381/322 |
| 2004/0107271 A1 | 6/2004 | Ahn et al. ..................... 709/219 |
| 2004/0209569 A1 | 10/2004 | Heinonen et al. ............. 455/41.2 |
| 2004/0224650 A1 | 11/2004 | Hundal et al. ............. 455/114.2 |
| 2004/0229658 A1 | 11/2004 | Kim et al. .................. 455/569.1 |
| 2005/0090295 A1 | 4/2005 | Ali et al. .................... 455/575.2 |
| 2005/0181844 A1 | 8/2005 | Edeler et al. .............. 455/575.2 |
| 2006/0128503 A1 | 6/2006 | Savarese et al. ............. 473/353 |
| 2006/0166719 A1 | 7/2006 | Arad et al. ................. 455/575.2 |

FOREIGN PATENT DOCUMENTS

WO 03/055183 7/2003

*Primary Examiner* — Wen Huang
(74) *Attorney, Agent, or Firm* — Allen, Dyer, Doppelt, Milbrath & Gilchrist, P.A.

(57) ABSTRACT

A wireless headset has improved immunity to RF electromagnetic interference produced from wireless communications devices. A headset body is adapted to be worn by a user and includes a microphone and earpiece. An antenna receives wireless communication signals and passes them to RF and audio circuitry mounted within the headset body. The RF and audio circuitry include a Bluetooth module operatively connected to the antenna for transmitting and receiving wireless communication signals, an audio CODEC connected to the Bluetooth module, and audio connection lines connected between the CODEC and the earpiece and between the CODEC and the microphone. A filter is connected into each of the audio connection lines at the earpiece and microphone and operative for reducing the RF coupling from a mobile wireless communications device.

13 Claims, 6 Drawing Sheets

WIRELESS HEADSET HAVING IMPROVED RF IMMUNITY TO RF ELECTROMAGNETIC INTERFERENCE PRODUCED FROM A MOBILE WIRELESS COMMUNICATIONS DEVICE

RELATED APPLICATION

This application is a continuation of Ser. No. 11/289,904 filed on Nov. 30, 2005, now U.S. Pat. No. 7,515,944 issued Apr. 7, 2009, which is hereby incorporated herein in its entirety by reference.

FIELD OF THE INVENTION

This invention relates to wireless headsets, and more particularly, this invention relates to wireless headsets that incorporate a Bluetooth module.

BACKGROUND OF THE INVENTION

Wireless headsets that incorporate a Bluetooth module to enable its wireless communications are becoming more commonplace and are advantageous because Bluetooth eliminates the connection of wires associated with most consumer computer equipment and allows a collection of products to function as an intelligent whole. It also makes location connectivity seamless. A Bluetooth system or module typically includes a radio, a baseband controller, a link manager, a logical link control, an adaptation protocol manager, host controller interface and application program interface library.

One common application of a Bluetooth module is with a headset for cellular or other mobile wireless communications devices. A wireless, Bluetooth headset would not require connecting wires between any mobile device and the headset. A drawback of this wireless or Bluetooth headset, however, concerns the RF interference that occurs from a mobile wireless communications device to the wireless headset. This interference can cause unwanted audible noise, such as Global System for Mobile communications (GSM) buzz, which can be annoying to users.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
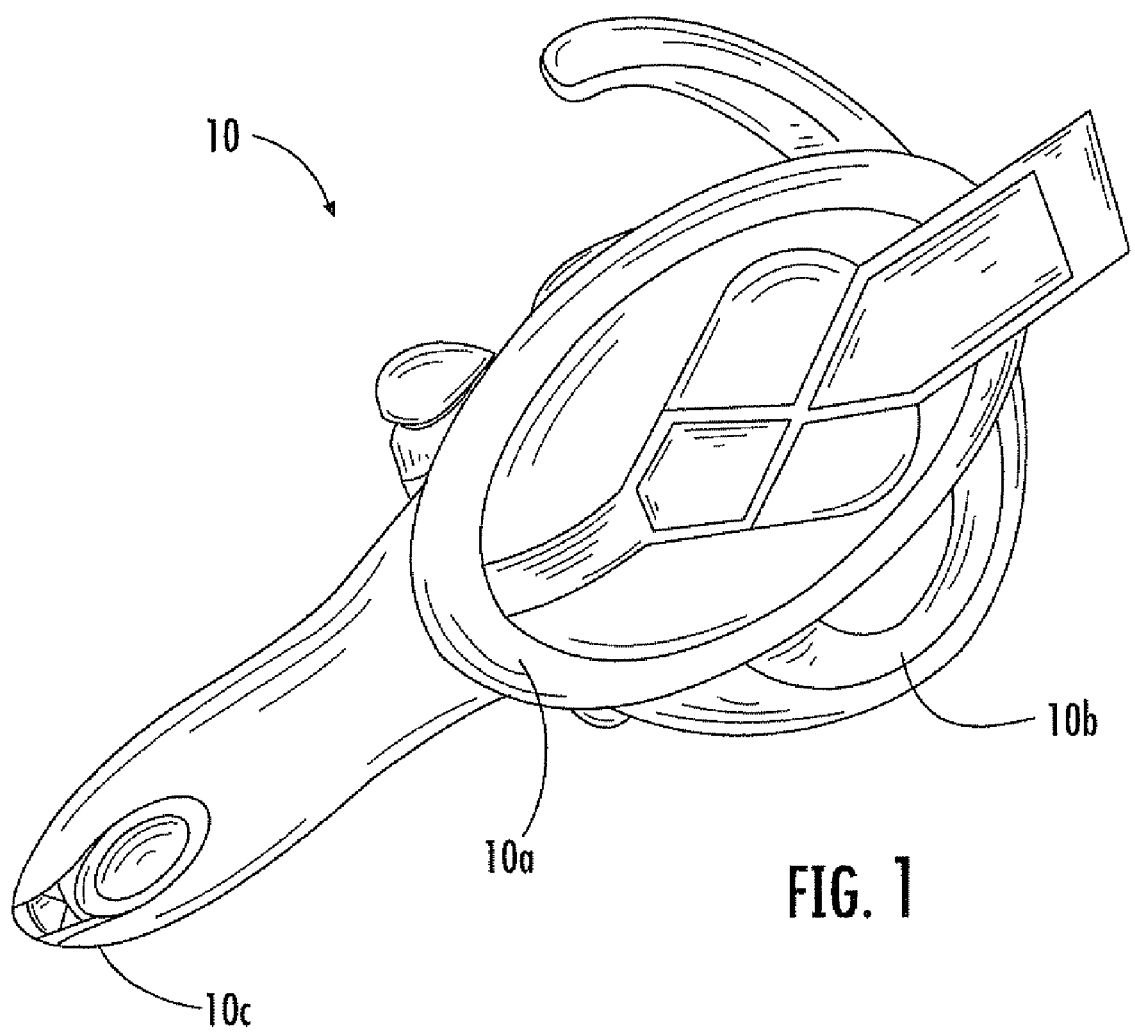
FIG. 1 is a perspective view of a wireless "Bluetooth" headset that can incorporate an RF filter to reduce RF coupling from a mobile wireless communications device, in accordance with one non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

In accordance with one non-limiting embodiment, RF filters and RF shielding can be implemented and applied to a microphone circuit and speaker circuit in a wireless "Bluetooth" headset. These types of filters and shielding can also be applied to a power supply circuit and other circuits to reduce the RF coupling from the wireless communications device to those circuits used in the Bluetooth headset, which causes the audible unwanted noise, such as GSM buzz.

A wireless headset has improved immunity to RF electromagnetic interference produced from wireless communication devices, for example, a cellular phone. A headset body is adapted to be worn by a user and includes a microphone carried by the headset body for receiving voice signals from the user and an earpiece carried by the headset body for directing voice signals into an ear canal of the user. RF and audio circuitry are mounted within the headset body and connected to an antenna for receiving and transmitting wireless communications signals. The RF and audio circuitry include a Bluetooth module operatively connected to the antenna and an audio CODEC connected to the Bluetooth module. Audio connection lines are connected between the CODEC and the earpiece and between the CODEC and the microphone. A filter is connected into each of the audio connection lines at the earpiece and microphone and operative for reducing the RF coupling from a wireless communications device.

In yet another non-limiting example, a filter is serially connected into each audio connection line and can be formed as a ferrite inductor, including a ferrite bead. The filter can also be formed as an LC filter serially connected into an audio connection line. In another aspect, a series connected inductor and capacitor can be connected into an audio connection line connected to the earpiece. The inductor could be formed as a ferrite inductor and an RF shield could surround one of at least the earpiece or microphone to aid in reducing the RF coupling from a mobile wireless communications device. This RF shield could be formed as a metallic housing.

In yet another aspect, microphone bias lines connect the CODEC and microphone for passing microphone bias control signals between the CODEC and the microphone. A microphone bias filter, in one non-limiting aspect, would be operative with the microphone bias lines for reducing the RE coupling from a wireless communications device. The microphone bias filter could be formed as a serial inductor, shunt capacitor, or ferrite bead. It can also be formed as a ground connected capacitor. A method aspect is also set forth.

FIG. 1 is a perspective view of a wireless or Bluetooth headset illustrated generally at 10, which includes a headset body 10a that is adapted to be worn by a user at the ear of the user, and a pivoting, C-shaped earmount 10b that wraps around the ear. When wrapped around the ear, an earpiece (not shown) carried by the headset body is engaged against the ear and directs voice signals into the ear canal of the user. A pivoting microphone arm 10c supports a microphone that receives voice signals from the user. The illustrated wireless headset has no wires and can interact wirelessly with different Bluetooth compliant devices, for example, handsets, PDA's and computers. The pivoting microphone arm 10c and earmount 10b are foldable such that when unfolded, the headset 10 is activated, allowing ready connection into received or placed calls. The entire headset body 10a can be worn over either ear of a user. A volume control (not shown) would typically remain in an upward position when it is worn.

Figure 2:
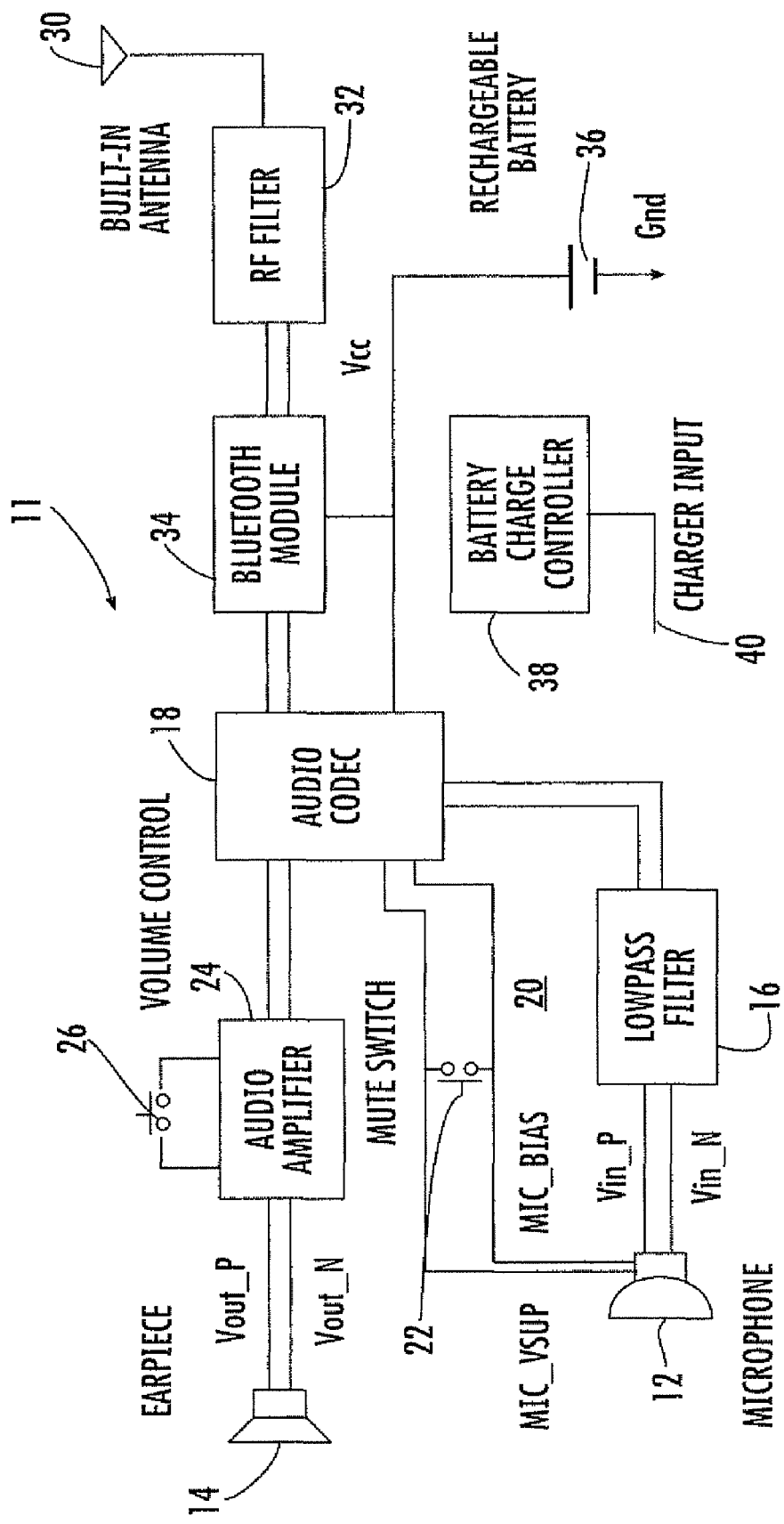
FIG. 2 is a block diagram showing basic functional components of a wireless or Bluetooth headset that could be adapted to incorporate an RF filter to decrease unwanted audible noise, such as GSM buzz.

FIG. 2 is a high-level block diagram of the wireless Bluetooth headset 11, which includes a microphone 12 and earpiece 14. The microphone 12 is connected by dual input or audio connection lines Vin_P and Vin_N through a low pass filter 16 to an audio CODEC (COder-DECoder) 18, which converts the analog signals to and from a digital data stream. A feedback loop 20 extends between the audio CODEC 18 and the microphone 12, and includes a bias line (MIC_BIAS) and voltage line (MIC_VSUP) extending to the microphone 12, forming microphone bias lines to allow microphone bias control signals to pass from the CODEC to the microphone. A mute switch 22 is connected into the two lines. The audio CODEC 18 also connects to an audio amplifier circuit 24, which includes a volume control 26 connected in parallel. The audio amplifier 24 passes an analog output signal to the earpiece 14 through Vout_P and Vout_N signal or audio connection lines extending between the CODEC and earpiece. A built-in antenna 30 receives RF signals and passes them into an RF filter 32, which filters the RF signals. The filtered signals are received in a Bluetooth module 34, which is connected to a rechargeable battery 36 operative with a battery charge controller 38 and charger input 40. The Bluetooth module 34 is operatively connected to the audio CODEC 18. These components as illustrated and described could be formed on a circuit board or other support and mounted within the headset body 10a. The different audio connection lines could be formed as signal or circuit traces or other means as known to those skilled in the art.

Figure 3:
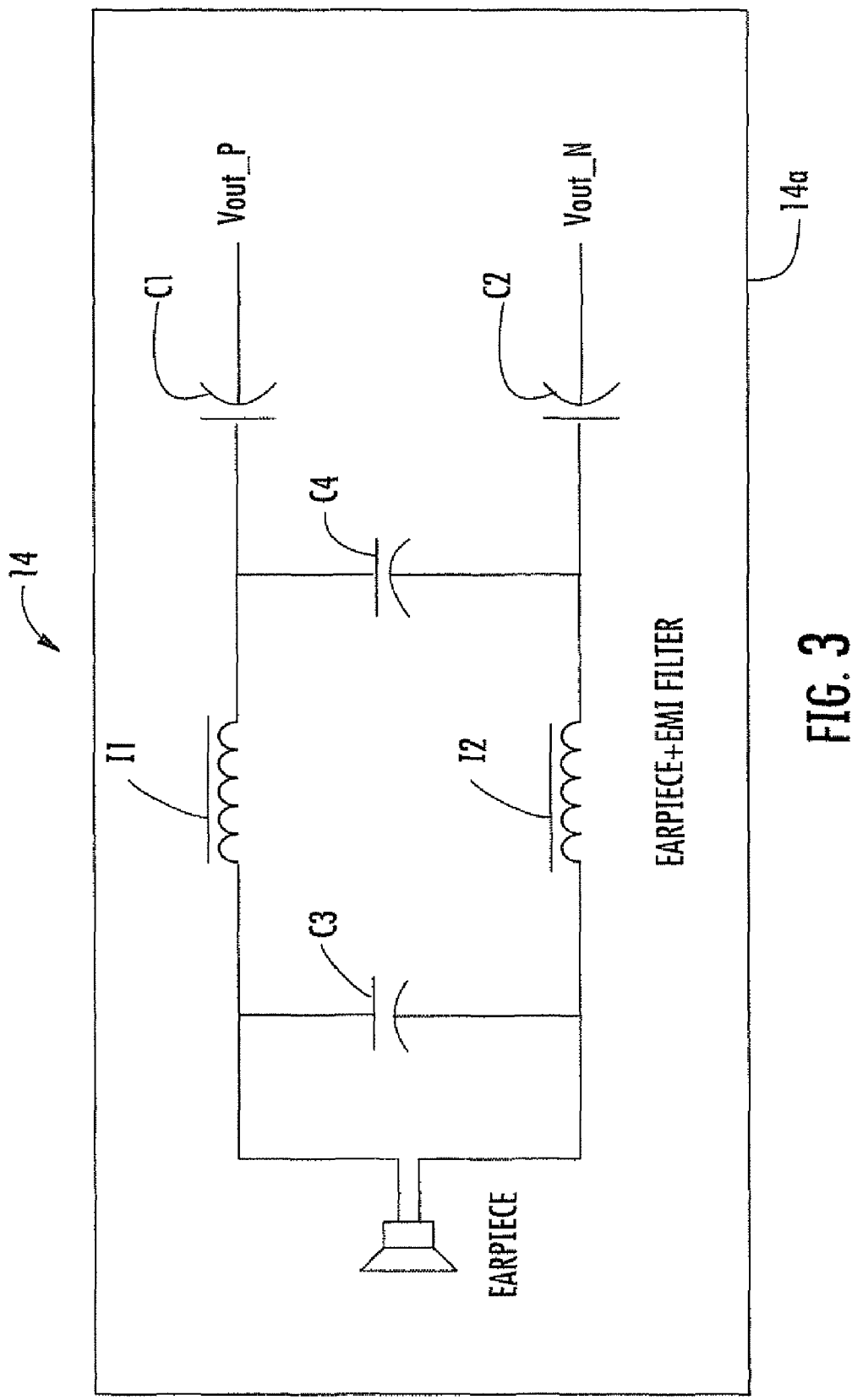
FIG. 3 is a schematic circuit diagram showing a combination earpiece and filter circuit, which could be incorporated into the earpiece shown in FIG. 2.
Figure 4:
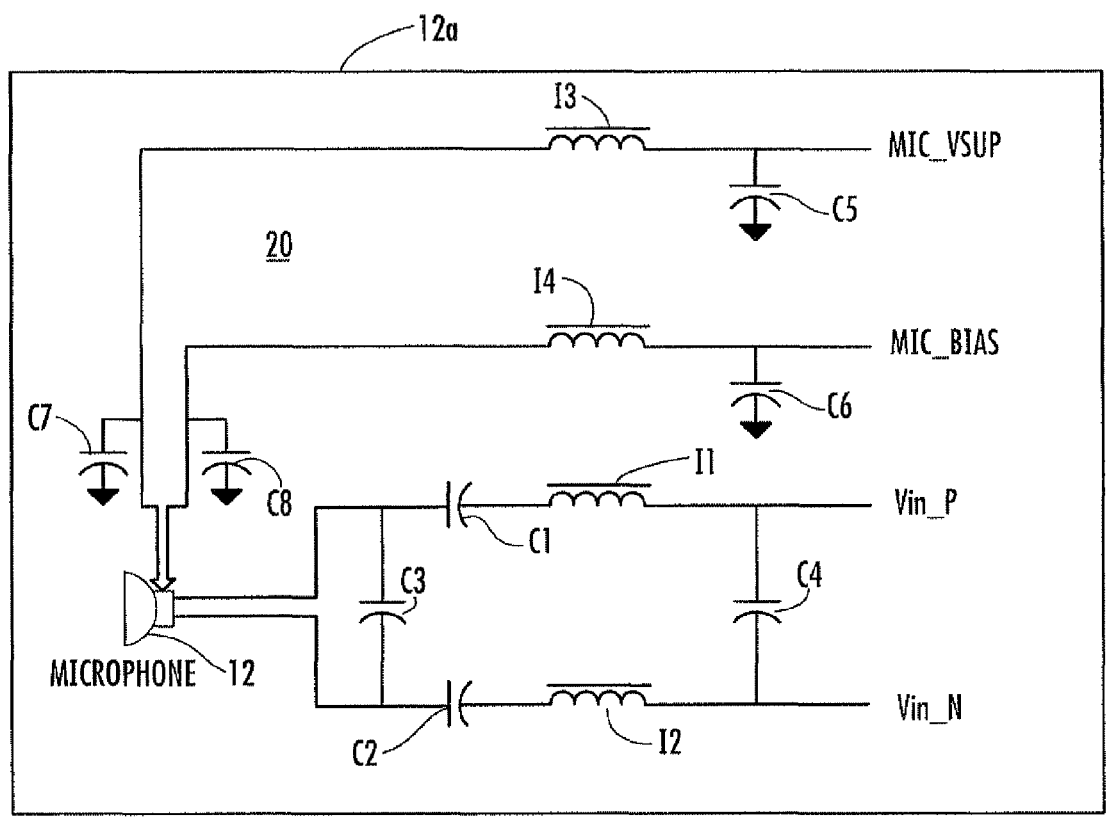
FIG. 4 is a schematic circuit diagram showing a combination microphone and filter circuit, which could be incorporated in the microphone shown in FIG. 2.

FIGS. 3 and 4 illustrate the type of Radio Frequency (RF) electromagnetic interference (EMI) filters that can be used for the microphone 12 (FIG. 4) and the earpiece 14 (FIG. 3).

FIG. 3 shows a filter for the earphone illustrating the Vout_P and Vout_N signal or audio connection lines. Each line includes an inductor element I1, I2 and series connected capacitor elements C1, C2. Two parallel capacitors C3 and C4 are connected as illustrated. The inductors in each line can be formed as ferrite inductors, including a ferrite bead.

As shown in FIGS. 2 and 4, the microphone 12 includes an output into the low pass filter 16 as Vin_P, Vin_N audio connection lines. A capacitor C1, C2 and an inductor I1, I2 as an inductive coil are connected into each Vin_P and Vin_N line. Capacitors C3, C4 are connected parallel into the Vin_P and Vin_N lines and positioned on either side of capacitors C1, C2 and inductors I1, I2 as illustrated. The feedback circuit 20 from audio CODEC 18 control includes two signal or microphone bias lines, MIC_VSUP and MIC_BIAS, and each line includes an inductive coil I3, I4 and grounded capacitor C5, C6, followed by another ground connected capacitor C7, C8 mounted parallel and connected into each line as the signal enters the microphone as illustrated.

The RF filters as described could be RF ferrite beads, serially connected inductors, or shunt capacitors or a combination of both. In another aspect, an isolation RF shield as a metallic formed enclosure or "can" could surround and isolate the microphone or earpiece transducer from radiating energy depending on the design. The solid line 12a, 14a in FIGS. 3 and 4 represents the "can" that could be used.

Different types, sizes and shapes of ferrite beads can be used. Typically, a ferrite bead is formed from a material having a permeability controlled by the composition of the different oxides, for example, a ferric oxide, sometimes with nickel and zinc added. The ferrite beads can sometimes be formed as ferrite sleeves with two half parts that are added onto a signal line or a solder overcoat on a signal trace. Typically, the longer the bead, the better the RF suppression. The bead equivalent circuit can be a series resistor and inductor.

Many of the components as described can be formed as an integrated circuit and contained within the headset body. The components can be mounted on a dielectric substrate, i.e., a circuit board. A circuit board could refer to any dielectric substrate, PCB, ceramic substrate or other circuit carrying structures for carrying signal circuits in electronic components. The battery 36 would typically be included within any headset housing for the Bluetooth headset. Ferrite beads or similar inductor components can also be used with modifications.

It should be understood that the RF and EMI filters as described relative to FIGS. 2-4 can be used in many different types of Bluetooth headsets. Typically, a Bluetooth headset includes a Bluetooth module and is operative as a wireless technology standard for connecting devices to replace cables. It typically operates in radio frequencies in the 2.5 GHz air interface and can transmit short distances of about 10 meters or less as a class 2 device. Usually, a Bluetooth system has a bandwidth of about one megabyte per second (1 MBPS) with individual packets of up to 2,745 bits. A class 1 Bluetooth device could have a signal strength up to about 100 milliwatts for a range of about 100 meters in certain applications.

Usually three basic components are incorporated in a Bluetooth module, including a processor, a baseband link controller that manages core Bluetooth processes, and a radio that implements the 2.5 GHz air interface.

The Bluetooth architecture typically includes an application program interface (API) libraries that are software modules that connect to host application programs to a Bluetooth communication system. The logical link control and adaptation protocol manages high level aspects of each connection, including encryption. It can convert the format of data between application program interfaces and lower level Bluetooth protocols. The link manager can manage physical details for Bluetooth connections. The baseband is a digital engine of a Bluetooth system. The Bluetooth radio converts digital baseband data to an from the 2.4 GHz analog signal typically using Gaussian frequency shift keying (GFSK) modulation.

Figure 5:
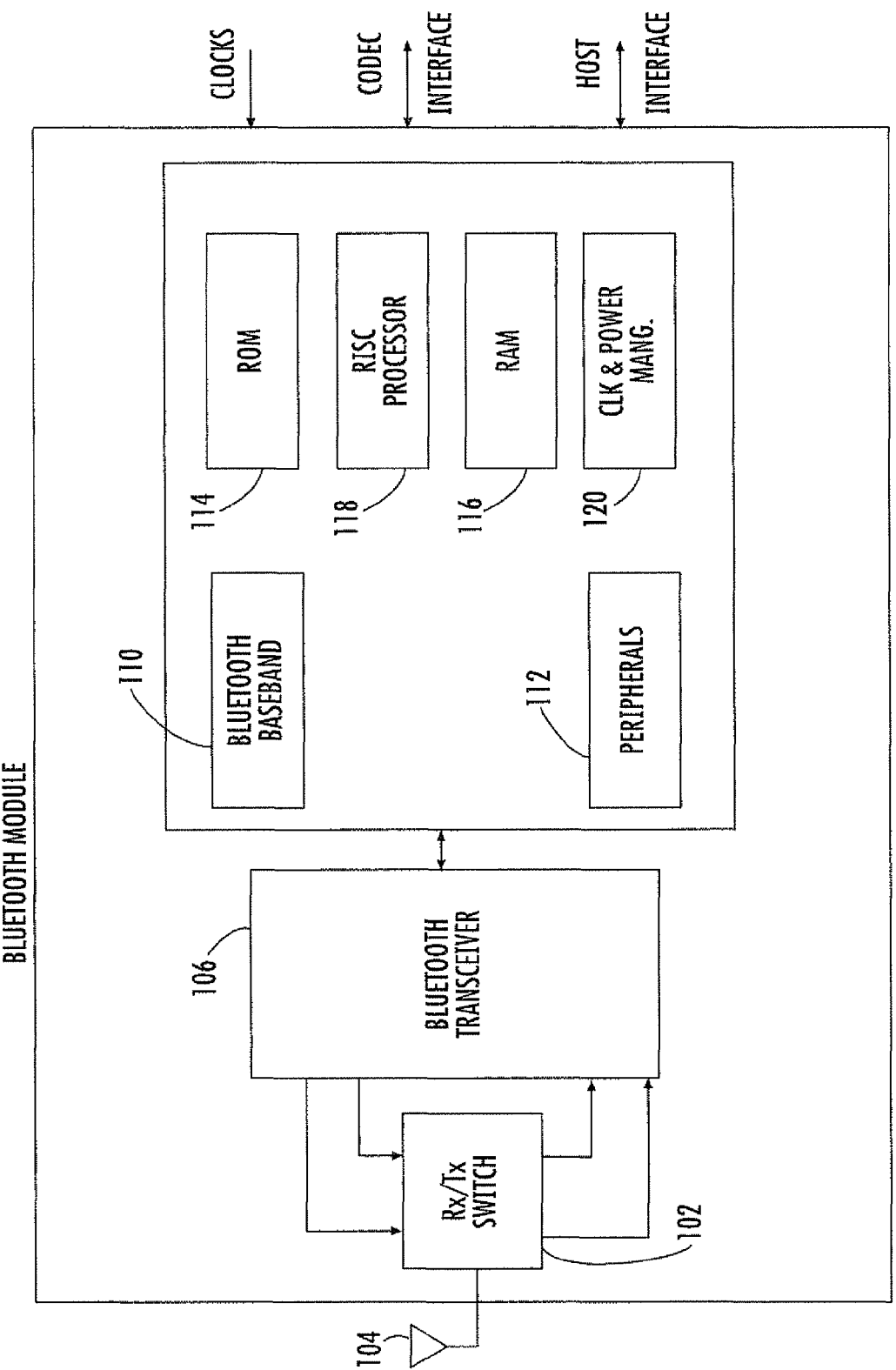
FIG. 5 is a high-level block diagram of a Bluetooth module that could be used in the wireless headset shown in FIG. 2.

FIG. 5 is a block diagram of a typical Bluetooth module 100 that can be used with the different embodiments of a Bluetooth headset. As illustrated, a receive/transmit (Rx/Tx) switch 102 receives signals from an antenna 104 (which could correspond to antenna 30 described relative to FIG. 2) and is operative with a Bluetooth transceiver 106, operative with Bluetooth components that receive clock signals and are operative with a CODEC interface and Host interface. These functional components include a Bluetooth baseband circuit 110, peripherals circuit 112, ROM 114 and RAM 116, a RISC processor 118 and clock and power management circuit 120. Of course, many other components could be used as known to and suggested by those skilled in the art. An example of such a functional Bluetooth module is a BRF 6100/6150 Bluetooth module manufactured by Texas Instruments.

Figure 6:
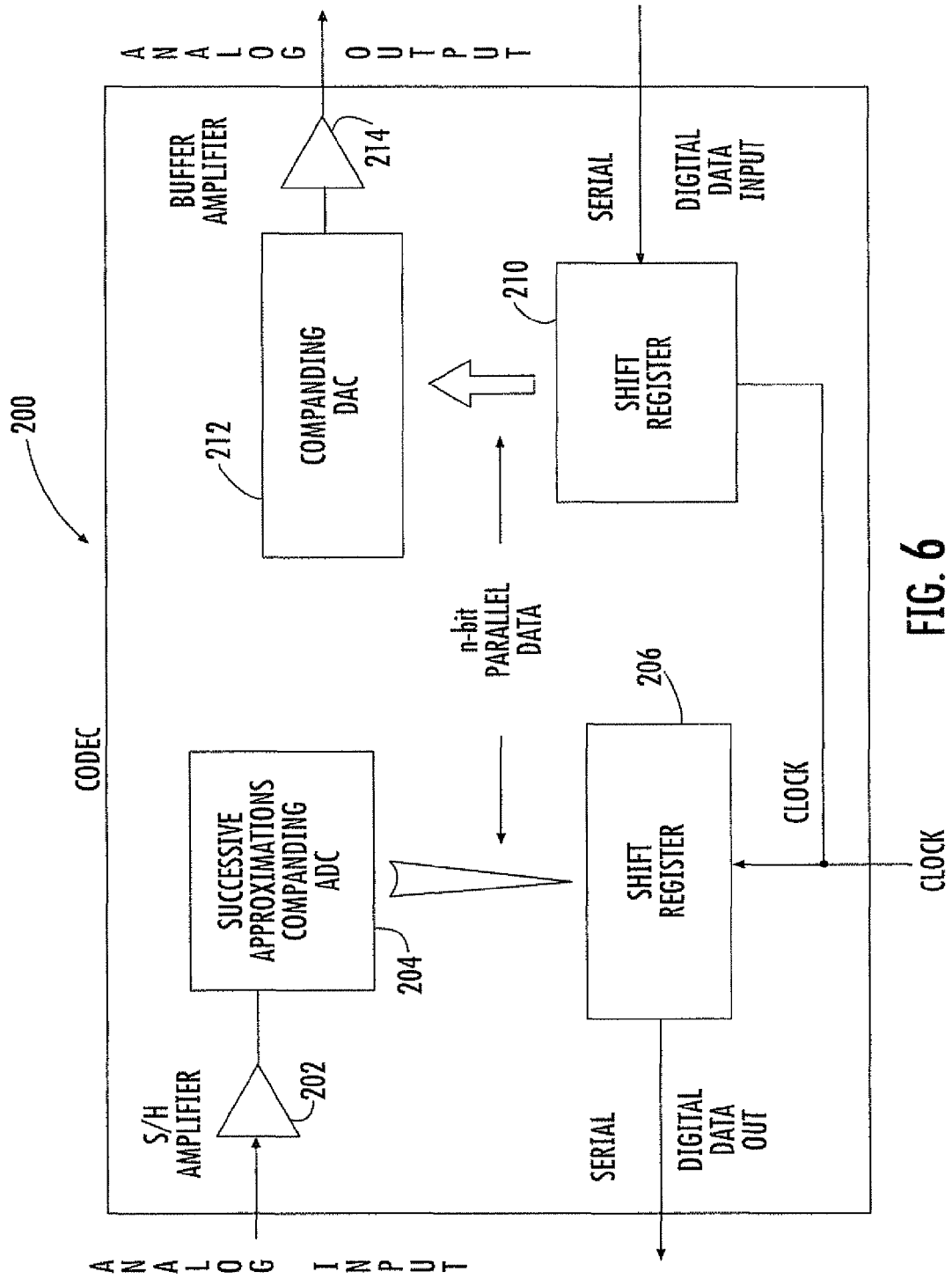
FIG. 6 is a high-level block diagram of an audio CODEC that could be used in the wireless headset shown in FIG. 2.

Different types of CODEC's can also be used in the circuit shown in FIG. 2, and an example CODEC is shown in FIG. 6 at 200, and could be used in a Bluetooth headset and operative with the Bluetooth module. For example, as illustrated, the CODEC could include an analog input into a S/H (Sample/Hold) amplifier 202 that passes to a successive approximations companding analog-to-digital converter (ADC) 204. A shift register 206 receives the signal from the successive approximations companding ADC 204 and produces a serial digital data output. A clock signal is applied to the shift register 206 and also applied to a second shift register 210 that sends data to a companding digital-to-analog converter (DAC) 212 that transmits the converted signal through a buffer amplifier 214 as an analog output. Serial digital data input is received in the second shift register. N-bit parallel data pass between components as illustrated.

The CODEC could include a transmit functional component that includes an analog input, amplifier, filters, sample and hold circuit comparator, successive approximation circuit, and an output register with feedback and control logic. The CODEC could also include a receive function that includes an input register, digital-to-analog converter (DAC), receive control logic that inputs into a sample and hold (S/H) circuit, which is buffered and filtered using an adder and gain set logic. General control logic could be operative with the digital-to-analog converter and receive control logic. The sample and hold circuit could receive a reference.

It should also be understood that the CODEC can use delta modulation to minimize the effects of noise without increasing the number of bits being transmitted. Adaptive delta modulation could also be used, which aids in overcoming the slope overload problem by varying the step size such that the quantized signal more closely follows the original signal.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless headset having improved immunity to RF electromagnetic interference produced from wireless communications devices comprising:
    a headset body adapted to be worn by a user;
    a microphone carried by the headset body for receiving voice signals from the user;
    an earpiece carried by the headset body for directing voice signals into an ear canal of the user;
    an antenna carried by the headset body for receiving wireless communications signals;
    RF and audio circuitry mounted within the headset body and connected to the antenna for receiving and transmitting wireless communications signals, an audio CODEC connected to said RF and audio circuitry, and further comprising at least one circuit board mounted within the headset body and audio connection lines formed as circuit traces on the at least one circuit board and connected between said CODEC and said earpiece and connected between said CODEC and said microphone; and
    a filter connected into each of the audio connection lines at the earpiece and microphone and operative for reducing the RF coupling from a wireless communications device wherein each signal trace includes a respective filter serially connected into each signal trace and a ferrite bead formed on a circuit trace and having a length as an overcoat on the circuit trace sufficient for enabling RF suppression.

2. The wireless headset according to claim 1, wherein a filter comprises an LC filter serially connected into an audio connection line.

3. The wireless headset according to claim 1, and further comprising a series connected inductor and capacitor connected into an audio connection line that is connected to said earpiece.

4. The wireless headset according to claim 1, wherein said inductor comprises a ferrite inductor.

5. The wireless headset according to claim 1, and further comprising an RF shield surrounding one of at least the earpiece or microphone to aid in reducing the RF coupling from a wireless communications device.

6. The wireless headset according to claim 5, wherein said RF shield comprises a metallic housing.

7. The A wireless headset according to claim 1, wherein said headset body includes a pivoting microphone arm that supports the microphone.

8. The wireless headset according to claim 1, and further comprising an earmount pivotally connected to said headset body.

9. The wireless headset according to claim 1, wherein said RF and audio circuitry comprises a Bluetooth module.

10. A method of making a wireless headset having improved immunity to RF electromagnetic interference produced from wireless communications devices, which comprises:
    providing a headset body adapted to be worn by a user, a microphone carried by the headset body for receiving voice signals from the user, an earpiece carried by the headset body for directing voice signals into an ear canal of the user, an antenna carried by the headset body for receiving wireless communications signals, RF and audio circuitry connected to the antenna and mounted within the headset body for receiving and transmitting wireless communications signals, and an audio CODEC connected to said RF and audio circuitry and further comprising at least one circuit board mounted within the headset body; and
    reducing the RF coupling from a wireless communications device by connecting a filter into audio connection lines formed as signal traces on the at least one circuit board that connect the earpiece and microphone with the CODEC such that each signal trace includes a respective filter serially connected into each signal trace and comprising a ferrite bead formed as a circuit trace and having a length as an overcoat on the circuit trace sufficient for enabling RF suppression.

11. The method according to claim 10, which further comprises enclosing one of at least the microphone or earpiece within an RF shield for reducing the RF coupling from a mobile wireless communications device.

12. The method according to claim 10, which further comprises connecting a microphone bias filter into microphone bias lines that pass microphone bias control signals between the CODEC and the microphone.

13. The method according to claim 10, which further comprises forming the RF and audio circuitry as a Bluetooth module.

* * * * *